(12) United States Patent
Yu et al.

(10) Patent No.: US 12,271,911 B2
(45) Date of Patent: Apr. 8, 2025

(54) METHOD, APPARATUS, DEVICE AND STORAGE MEDIUM FOR VERIFYING REAL STORE

(71) Applicant: CHINA UNIONPAY CO., LTD., Shanghai (CN)

(72) Inventors: Weiqi Yu, Shanghai (CN); Xusen Yang, Shanghai (CN); Hua Jiang, Shanghai (CN); Lan Liu, Shanghai (CN); Sishuang Wan, Shanghai (CN); Xiaohan She, Shanghai (CN); Xiongyu Wang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/689,815

(22) PCT Filed: Jul. 29, 2022

(86) PCT No.: PCT/CN2022/109255
§ 371 (c)(1),
(2) Date: Mar. 6, 2024

(87) PCT Pub. No.: WO2023/109143
PCT Pub. Date: Jun. 22, 2023

(65) Prior Publication Data
US 2024/0273555 A1      Aug. 15, 2024

(30) Foreign Application Priority Data
Dec. 17, 2021   (CN) .......................... 202111556733.X

(51) Int. Cl.
*G06F 16/2455*   (2019.01)
*G06Q 30/018*    (2023.01)

(52) U.S. Cl.
CPC ..... *G06Q 30/0185* (2013.01); *G06F 16/2455* (2019.01)

(58) Field of Classification Search
CPC .......................... G06Q 30/0185; G06F 16/2455
(Continued)

(56) References Cited

U.S. PATENT DOCUMENTS 7,917,536 B2 *   3/2011   Lora ..................... G06F 16/25
                                                    707/661
8,156,142 B2 *   4/2012   Gruber ............... G06F 16/3344
                                                    707/706
(Continued)

FOREIGN PATENT DOCUMENTS

CN   106126719 A   11/2016
CN   106156279 A   11/2016
(Continued)

OTHER PUBLICATIONS

International Search Report and Written Opinion dated Oct. 11, 2022 for International Application No. PCT/CN2022/109255.
(Continued)

*Primary Examiner* — Hanh B Thai

(57) ABSTRACT

A method, apparatus, device and storage medium for verifying a real store, which belong to the field of data processing. The method includes: acquiring inputted store information of a first store (S101); searching for, based on the store name and the store address of the first store, a first target store name in a first target area in an electronic map (102) searching for, based on the store address of the first store, a real store address database, and the store name of the first store, a second target store name in a second target area in the electronic map (S103) determining, under a condition that the first target store name or the second target store name exists, that the first store is a real store (S104).

16 Claims, 6 Drawing Sheets

(58) Field of Classification Search
USPC .......................................................... 707/758
See application file for complete search history.

(56) References Cited

U.S. PATENT DOCUMENTS

| | | | | |
|---|---|---|---|---|
| 8,321,463 | B2* | 11/2012 | Cierniak | G06F 16/335 |
| | | | | 707/706 |
| 8,352,465 | B1* | 1/2013 | Jing | G06F 16/583 |
| | | | | 707/723 |
| 8,572,077 | B2* | 10/2013 | Dorfman | G09B 29/12 |
| | | | | 707/727 |
| 9,542,435 | B2* | 1/2017 | Kinugawa | G06F 16/2425 |
| 10,140,315 | B1 | 11/2018 | Hohwald | G06F 16/24578 |
| 11,089,441 | B2* | 8/2021 | Eisner | H04W 4/029 |
| 11,176,180 | B1* | 11/2021 | Gudur | G06F 16/3344 |
| 11,238,049 | B1* | 2/2022 | James | G06F 40/30 |
| 11,275,733 | B1* | 3/2022 | Batsakis | G06F 16/137 |
| 11,514,488 | B1* | 11/2022 | Rawal | G06F 16/9535 |
| 11,573,971 | B1* | 2/2023 | Cannon | G06F 16/252 |
| 11,599,667 | B1* | 3/2023 | Tutuianu | G06N 5/04 |
| 11,620,303 | B1* | 4/2023 | Roy | G06F 16/313 |
| | | | | 707/736 |
| 11,715,051 | B1* | 8/2023 | Baskaran | G06N 5/04 |
| | | | | 707/758 |
| 11,775,357 | B1* | 10/2023 | Ghuman | G06F 16/35 |
| | | | | 707/738 |
| 11,782,570 | B2* | 10/2023 | Hsiao | G06F 3/04815 |
| | | | | 715/736 |
| 11,789,986 | B1* | 10/2023 | Bhimani | G06F 16/242 |
| | | | | 707/722 |
| 11,983,297 | B2* | 5/2024 | Tutuianu | G06F 16/29 |
| 2004/0128196 | A1* | 7/2004 | Shibuno | G06Q 30/0271 |
| | | | | 705/14.66 |
| 2008/0195487 | A1* | 8/2008 | Amengual | G06Q 30/0256 |
| | | | | 707/E17.115 |
| 2011/0184968 | A1* | 7/2011 | Kitajima | G06F 16/2458 |
| | | | | 707/758 |
| 2011/0225173 | A1 | 9/2011 | Gulhane et al. | |
| 2012/0005045 | A1* | 1/2012 | Baker | G06F 3/04842 |
| | | | | 715/848 |
| 2012/0323877 | A1* | 12/2012 | Ray | G06F 16/9535 |
| | | | | 707/706 |
| 2014/0114847 | A1* | 4/2014 | Watanabe | G06Q 30/02 |
| | | | | 705/39 |
| 2015/0088860 | A1 | 3/2015 | Hamby et al. | |
| 2015/0170333 | A1* | 6/2015 | Jing | G06F 16/532 |
| | | | | 345/660 |
| 2016/0232411 | A1* | 8/2016 | Krishnamoorthy | |
| | | | | H04N 23/6811 |
| 2017/0185601 | A1* | 6/2017 | Qin | G06Q 50/01 |
| 2018/0107654 | A1 | 4/2018 | Jung | |
| 2018/0213354 | A1* | 7/2018 | Wang | H04M 1/72457 |
| 2018/0218424 | A1* | 8/2018 | Yonaha | G06V 10/761 |
| 2018/0246955 | A1* | 8/2018 | He | G06F 16/3344 |
| 2018/0357236 | A1 | 12/2018 | Bundrage | |
| 2019/0019016 | A1* | 1/2019 | Ikeda | H04N 23/611 |
| 2019/0370406 | A1* | 12/2019 | Bose | H04L 41/0893 |
| 2020/0099668 | A1* | 3/2020 | Gudur | H04L 63/20 |
| 2020/0099671 | A1* | 3/2020 | Shaw | H04L 63/061 |
| 2020/0184017 | A1* | 6/2020 | Batra | G06F 16/95 |
| 2021/0025966 | A1* | 1/2021 | Han | G01S 5/02526 |
| 2022/0262035 | A1* | 8/2022 | Liu | G06T 7/0002 |
| 2022/0292123 | A1* | 9/2022 | Hoppe | G06F 16/35 |
| 2022/0350641 | A1* | 11/2022 | Gilmore | G06F 11/3664 |
| 2023/0033804 | A1* | 2/2023 | Sun | H04W 4/21 |

FOREIGN PATENT DOCUMENTS

| | | |
|---|---|---|
| CN | 107038589 A | 8/2017 |
| CN | 107038589 B | 2/2019 |
| CN | 109582969 A | 4/2019 |
| CN | 109993545 A | 7/2019 |
| CN | 110223050 A | 9/2019 |
| CN | 110674419 A | 1/2020 |
| CN | 111832483 A | 10/2020 |
| CN | 111859060 A | 10/2020 |
| CN | 112613891 A | 4/2021 |
| CN | 113032584 A | 6/2021 |
| CN | 113065057 A | 7/2021 |
| CN | 107832325 B | 11/2021 |
| CN | 113590982 A | 11/2021 |
| CN | 114328656 A | 4/2022 |
| JP | 2010152724 A | 7/2010 |
| TW | I598839 B | 9/2017 |

OTHER PUBLICATIONS

The First Office Action dated May 31, 2023 for Taiwanese Application No. 111135589.

Rejection Decision dated Oct. 30, 2023 for Taiwanese Application No. 11135589.

The First Office Action dated Nov. 29, 2024 for Chinese Application No. 202111556733.X.

Mohammadreza Ektefa et al. "A threshold-based similarity measure for duplicate detection," 2011 IEEE Conference on Open Systems, Sep. 25-28, 2011.

Zhang Tao et al. "A Graph-based Similarity Measure Between Wikipedia Concepts and Its Application in Entity Linking System," Journal of Chinese Information Processing, Mar. 2015, vol. 29, No. 2.

* cited by examiner

METHOD, APPARATUS, DEVICE AND STORAGE MEDIUM FOR VERIFYING REAL STORE

CROSS REFERENCE TO RELATED APPLICATION

The present application is a national stage of International Application No. PCT/CN2022/109255 filed on Jul. 29, 2022, which claims priority to Chinese Patent Application No. 202111556733.X filed on Dec. 17, 2021, and titled "METHOD, APPARATUS, DEVICE AND STORAGE MEDIUM FOR VERIFYING REAL STORE", both of which are incorporated herein by reference in their entireties for all purpose.

TECHNICAL FIELD

The present application belongs to the field of data processing, and particularly relates to a method, apparatus, device and storage medium for verifying a real store.

BACKGROUND

With the development of electronic payment technology, the application range of electronic payment is wider and wider. When a user makes payment at a store, electronic payment is selected in most cases. In some cases, some people may forge a store and receive payments using the forged store, which brings risk to the user's electronic payment. Therefore, determining the authenticity of stores has become one of the key issues.

At present, it is necessary to send special staff for grid patrol to determine the authenticity of the stores, that is, the staff is sent to locations of the stores for on-site patrol one-by-one, however, the artificial patrol to determine the authenticity of the stores is relatively slow and very inefficient.

SUMMARY

Embodiments of the present application provide a method, apparatus, device and storage medium for verifying a real store.

In a first aspect, the embodiments of the present application provide a method for verifying a real store, including: acquiring inputted store information of a first store, the store information including a store name and a store address; searching for, based on the store name and the store address of the first store, a first target store name in a first target area in an electronic map, in which the first target store name is a store name in the first target area for which similarity to the store name of the first store satisfies a first preset condition; searching for, based on the store address of the first store, a preset real store address database, and the store name of the first store, a second target store name in a second target area in the electronic map, in which the second target store name is a store name in the second target area for which similarity to the store name of the first store satisfies a second preset condition, and the real store address database includes store addresses of real stores; and determining, under a condition that the first target store name or the second target store name exists, that the first store is a real store.

In a second aspect, the embodiments of the present application provide an apparatus for verifying a real store, including: an acquisition module configured to acquire inputted store information of a first store, the store information including a store name and a store address; a first search module configured to search for, based on the store name and the store address of the first store, a first target store name in a first target area in an electronic map, in which the first target store name is a store name in the first target area for which similarity to the store name of the first store satisfies a first preset condition; a second search module configured to search for, based on the store address of the first store, a preset real store address database, and the store name of the first store, a second target store name in a second target area in the electronic map, in which the second target store name is a store name in the second target area for which similarity to the store name of the first store satisfies a second preset condition, and the real store address database includes store addresses of real stores; and a determination module configured to determine, under a condition that the first target store name or the second target store name exists, that the first store is a real store.

In a third aspect, the embodiments of the present application provide a device for verifying a real store, including: a processor and a memory storing computer program instructions, in which the processor, when executing the computer program instructions, implements the method for verifying a real store according to the first aspect.

In a fourth aspect, the embodiments of the present application provide a computer-readable storage medium storing computer program instructions thereon, in which the computer program instructions, when executed by a processor, implement the method for verifying a real store according to the first aspect.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive effort.

DETAILED DESCRIPTION

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only used to explain the present application, but not to limit the present application. For those skilled in the art, the present application can be implemented without some of these specific details. The following description of the embodiments is only to provide a better understanding of the present application by illustrating examples of the present application.

With the development of electronic payment technology, the application range of electronic payment is wider and wider. When a user makes payment at a store, electronic payment is selected in most cases. In some cases, some people may forge a store and receive payments using the forged store, which brings risk to the user's electronic payment. Therefore, determining the authenticity of stores has become one of the key issues. A real store should correspond to an entity store in the real world. In order to determine the authenticity of stores, special staff may be sent for grid patrol, that is, the staff may be sent to locations of the stores for on-site patrol one-by-one, but the artificial patrol to determine the authenticity of the stores is relatively slow and very inefficient. Moreover, due to different qualifications of the staff, misjudgment may occur, which may adversely affect the accuracy for determining the authenticity of the stores.

The embodiments of the present application provide a method, apparatus, device and storage medium for verifying a real store, in which the authenticity of a store can be verified in combination with an electronic map by performing similarity comparison between the inputted store information and the store information in the electronic map. No artificial patrol is required, the efficiency for verifying the authenticity of the store can be increased, and the accuracy for verifying the authenticity of the store can also be increased to some degree.

The method, apparatus, device and storage medium for verifying a real store in the embodiments of the present application will be described one by one below.

Figure 1:
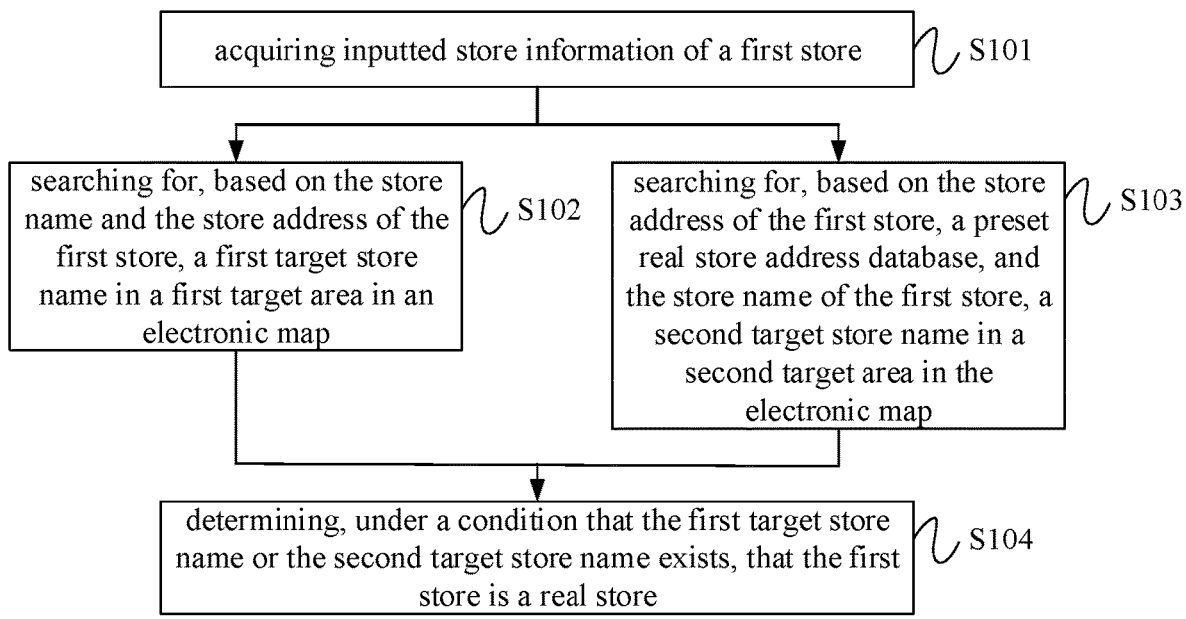
FIG. 1 shows a flowchart of one embodiment of a method for verifying a real store according to the present application.

A first aspect of the present application provides a method for verifying a real store, which can be applied to an apparatus or device for verifying a real store, that, the method for verifying a real store can be performed by the apparatus or device for verifying a real store, which is not limited herein. FIG. 1 shows a flowchart of one embodiment of a method for verifying a real store according to the present application. As shown in FIG. 1, the method for verifying a real store may include steps S101 to S104.

In step S101, inputted store information of a first store is acquired.

The first store is a store to be verified. The store information includes a store name and a store address. The store information of the first store may be in the form of text, or in the form of text converted from a picture or other forms. For example, the store name of the first store is "A3 Co. Ltd., A2 City, A1 Province", and the store address of the first store is "No. A6, A5 Street, A4 District, A2 City, A1 Province".

In some examples, redundancy removal processing may be performed on the store name. The redundancy removal processing is to remove the fields that adversely affect the accuracy of the similarity from the store name. For example, the fields such as "Co. Ltd.", "Company", "XX Province", "XX City", and "individual household" are redundant fields that frequently appear in the collected store names, which usually adversely affect the similarity. Therefore, the redundant fields may be removed from the store name in advance, so as to use the store name in which the redundant fields have been removed for subsequent steps.

In step S102, a first target store name is searched, based on the store name and the store address of the first store, in a first target area in an electronic map.

The first target store name is a store name in the first target area for which similarity to the store name of the first store satisfies a first preset condition. Specifically, the inputted store address of the first store may be searched in the electronic map using the search function of the electronic map to obtain a location, a store name for which similarity to the store name of the first store satisfies the first preset condition is found in an area including the location, i.e., the first target area, and determined as the first target store name.

The first preset condition is configured to select the store name in the first target area that is most likely to indicate the first store, and is not limited herein. In some examples, the first preset condition may include: the similarity to the store name of the first store is the highest among similarities between the store name of the first store and store names of stores in the first target area and is greater than a real similarity threshold value. That is, the first preset condition may include two conditions, e.g., condition one: the first target store name is the store name for which similarity to the store name of the first store is the highest among similarities between the store name of the first store and store names of stores in the first target area; and condition two: the similarity between the first target store name and the store name of the first store is greater than the real similarity threshold value. The real similarity threshold value may be set according to scenarios, requirements, experiences, etc., and is not limited herein. For example, the real similarity threshold value may be 0.6.

However, it should be noted that a situation in which the store name for which the similarity to the store name of the first store satisfies the first preset condition cannot be found in the first target area may exist, that is, a situation in which the first target store name does not exist may occur.

In step S103, a second target store name is searched, based on the store address of the first store, a preset real store address database, and the store name of the first store, in a second target area in the electronic map.

The real store address database includes store addresses of real stores. The real store address database may include the store addresses of the real stores accumulated in various ways. The second target store name is a store name in the second target area for which similarity to the store name of the first store satisfies a second preset condition. Specifically, a store address of a real store that is the most similar to the store address of the first store may be searched firstly in the real store address database, the store address of the most similar real store is searched in the electronic map using the search function of the electronic map to obtain a location, and a store name for which similarity to the store name of the first store satisfies the second preset condition is found in an area including the location, i.e., the second target area, and determined as the second target store name.

The second preset condition is configured to select the store name in the second target area that is most likely to indicate the first store, and is not limited herein. In some examples, the second preset condition may include: the similarity to the store name of the first store is the highest among similarities between the store name of the first store and store names of stores in the second target area and is greater than the real similarity threshold value. That is, the second preset condition may include two conditions, e.g., condition one: the second target store name is the store name for which similarity to the store name of the first store is the highest among similarities between the store name of the first store and store names of stores in the second target area; and condition two: the similarity between the second target store name and the store name of the first store is greater than the real similarity threshold value. Reference may be made to relevant descriptions in the above embodiments for details of the real similarity threshold value, which are not repeated herein.

However, it should be noted that a situation in which the store name for which the similarity to the store name of the first store satisfies the second preset condition cannot be found in the second target area may exist, that is, a situation in which the second target store name does not exist may occur.

In step S104, it is determined, under a condition that the first target store name or the second target store name exists, that the first store is a real store.

The existence of at least one of the first target store name and the second target store name indicates that the first store exists in an area in the electronic map matched with the descriptions of the store information of the first store, that is, the entity store corresponding to the first store exists in the real world, and it can be determined that the first store is a real store.

In the embodiments of the present application, the store name for which the similarity to the store name of the first store satisfies the condition in the first target area in the electronic map, i.e. the first target store name, may be found based on the inputted store name and store address of the first store. Moreover, the store name for which the similarity to the store name of the first store satisfies the condition in the second target area in the electronic map, i.e. the second target store name, may also be found based on the inputted store address of the first store, the inputted store name of the first store, and the store addresses of the real stores in the preset real store address database. At least one of the first target store name and the second target store name can be found, which indicates that an entity store corresponding to the first store exists in the electronic map, that is, the entity store exists in the real world, so that the authenticity of the store can be determined. No artificial participation is required in this process, and the efficiency for verifying the authenticity of the store is increased. Moreover, using the inputted store information in combination with the electronic map to search for similar store names in two target areas based on different conditions in the electronic map can further avoid errors in the search process and increase the accuracy for verifying the authenticity of the store.

Figure 2:
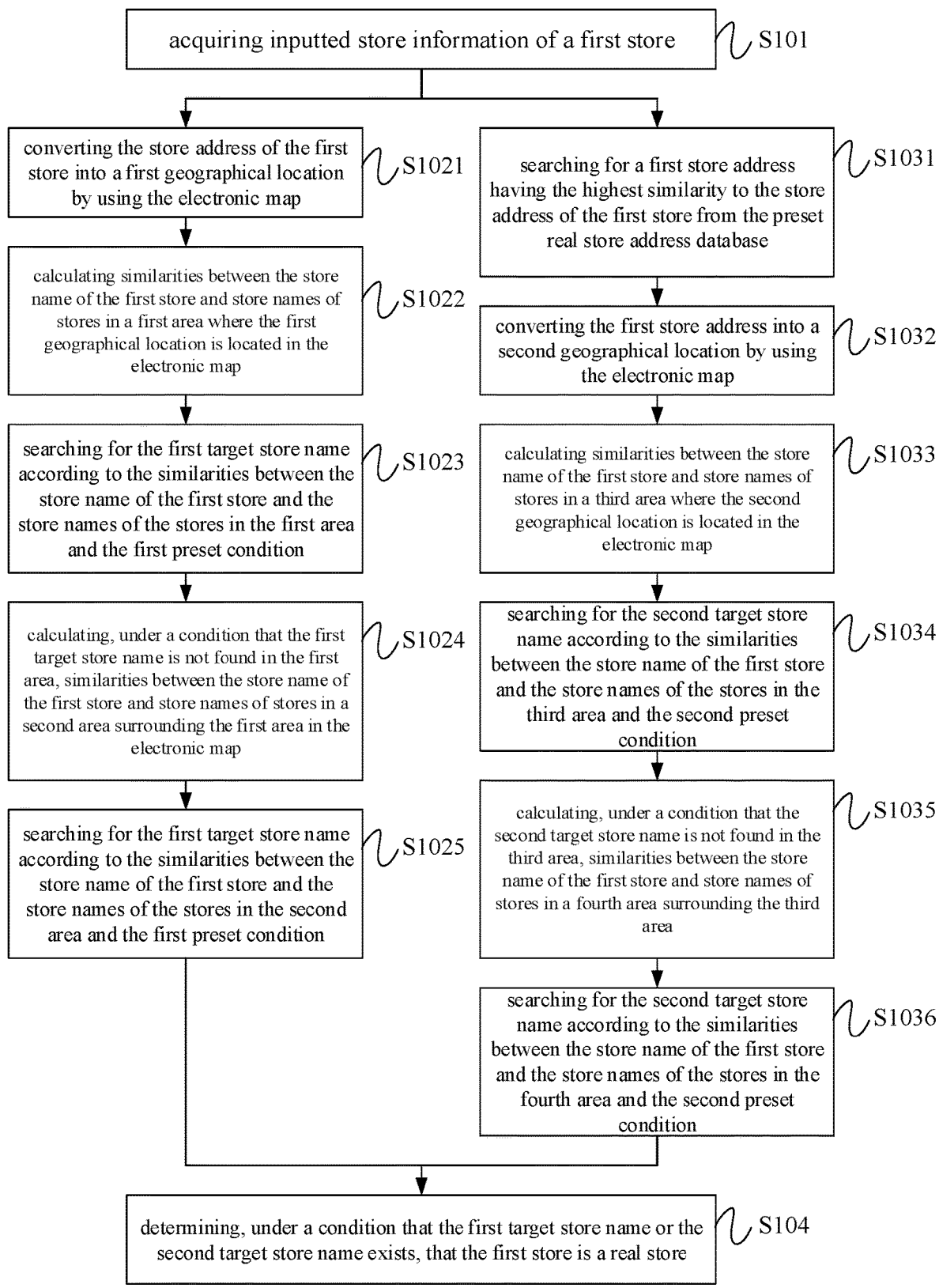
FIG. 2 shows a flowchart of another embodiment of a method for verifying a real store according to the present application.

In some embodiments, corresponding geographical locations may be respectively obtained, by using the electronic map, through conversion based on the store name and the store address of the first store, so as to obtain the first target area and the second target area. FIG. 2 shows a flowchart of another embodiment of a method for verifying a real store according to the present application. FIG. 2 differs from FIG. 1 in that step S102 in FIG. 1 can be subdivided into steps S1021 to S1025 in FIG. 2, and step S103 in FIG. 1 can be subdivided into steps S1031 to S1036 in FIG. 2.

In step S1021, the store address of the first store is converted into a first geographical location by using the electronic map.

Specifically, an interface of the electronic map for searching for Point of Interest (POI) function may be called, and the store address of the first store may be inputted to this interface of the electronic map, so as to convert the store address of the first store into a geographical location, i.e., the first geographical location, by using the electronic map. The first geographical location is a geographical location converted from the store address of the first store by using the electronic map. The first geographical location may specifically include longitude and latitude, or other specific parameters, which is not limited herein.

In step S1022, similarities between the store name of the first store and store names of stores in a first area where the first geographical location is located in the electronic map are calculated.

The first target area includes the first area. The first area includes the first geographical location, and the size, shape, and location of the first area may be set according to scenarios, requirements, experience, etc., which is not limited herein. In some examples, the first area may be a circular area centered at the first geographical location and having a radius of distance r1 which may be set according to scenarios, requirements, experience, etc., and for example, the distance r1 may be 1000 meters.

The higher the similarity between the store name of the first store and the store name of a certain store in the first area, the higher the likelihood that the first store is the same store as the certain store in the first area. The similarities between the store name of the first store and the store names of the stores in the first area may be calculated based on similarities in terms of attribute of the store name. The attribute of the store name may include one or more of semantic, feature structure, word order, etc., and is not limited herein.

In step S1023, the first target store name is searched according to the similarities between the store name of the first store and the store names of the stores in the first area and the first preset condition.

Under a condition that a store is found in the first area for which the similarity between the store name of the store and the store name of the first store satisfies the first preset condition, the store name of this store in the first area may be determined as the first target store name.

For example, the first preset condition includes: the similarity to the store name of the first store is the highest among similarities between the store name of the first store and store names of stores in the first target area and is greater than the real similarity threshold value. The first area includes five stores, and the store names of the five stores are XXXX1, XXXX2, XXXX3, XXXX4 and XXXX5, respectively, in which the similarity between the store name of XXXX3 and the store name of the first store is the highest among the similarities between the store names of the five stores and the store name of the first store, and the similarity between the store name of XXXX3 and the store name of the first store is greater than the real similarity threshold value, then XXXX3 may be determined as the first target store name.

In step S1024, under a condition that the first target store name is not found in the first area, similarities between the store name of the first store and store names of stores in a second area surrounding the first area in the electronic map are calculated.

In some cases, due to errors in the conversion from the store name of the first store to the first geographical location by the electronic map or other factors, the store name of the store for which similarity to the store name of the first store satisfies the first preset condition cannot be found in the first area, that is, the first target store name cannot be found in the first area. In this case, the first target area may be enlarged, and the first target store name is searched continuously in the enlarged area.

Figure 3:
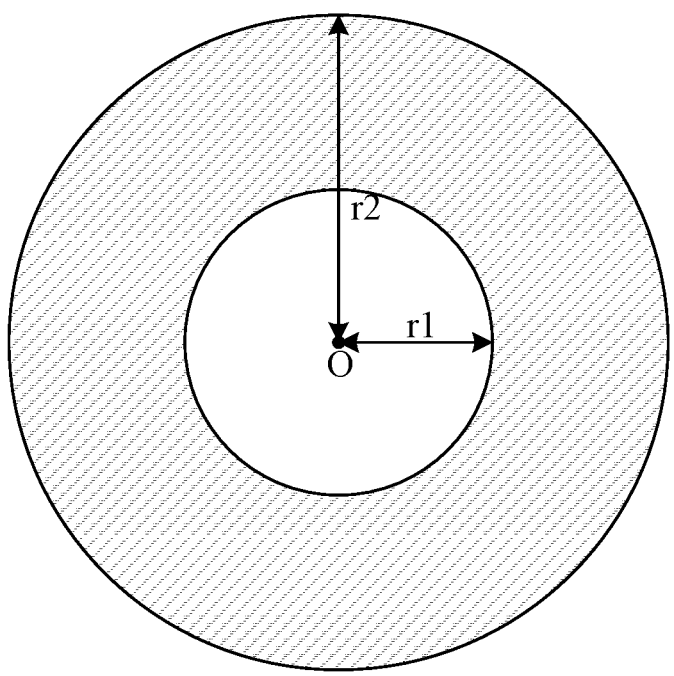
FIG. 3 shows a schematic diagram of an example of a first area and a second area according to an embodiment of the present application.

Specifically, the first target area may further include the second area. The second area is an outward extension of the first area and may surround the first area. In some examples, an inner boundary of the second area may overlap or be adjacent to an outer boundary of the first area, and a distance from the outer boundary of the first area to the first geographical location is less than a distance from an outer boundary of the second area to the first geographical location. The second area may be arranged around the first geographical location, and the distance from the outer boundary of the second area to the first geographical location may be determined according to scenarios, requirements, experience, etc., which is not limited herein, and for example, the distance from the outer boundary of the second area to the first geographical location may be 2000 meters. For example, FIG. 3 shows a schematic diagram of an example of a first area and a second area according to an embodiment of the present application. As shown in FIG. 3, the first geographical location is O(gps_x, gps_y), in which gps_x is the longitude and gps_y is the latitude; the first area is a circular area centered at the first geographical location and having a radius of r1; the inner boundary of the second area overlaps the outer boundary of the first area, the distance from the outer boundary of the second area to the first geographical location O is r2, and the second area is the annular shaded area in FIG. 3.

The higher the similarity between the store name of the first store and the store name of a certain store in the second area, the higher the likelihood that the first store is the same store as the certain store in the second area. The similarities between the store name of the first store and the store names of the stores in the second area may be calculated based on similarities in terms of attribute of the store name. The attribute of the store name may include one or more of semantic, feature structure, word order, etc., and is not limited herein.

In step S1025, the first target store name is searched according to the similarities between the store name of the first store and the store names of the stores in the second area and the first preset condition.

Under a condition that a store is found in the second area for which the similarity between the store name of the store and the store name of the first store satisfies the first preset condition, the store name of this store in the second area may be determined as the first target store name.

In step S1031, a first store address having the highest similarity to the store address of the first store is searched from the preset real store address database.

Specifically, the similarities between the store address of the first store and the store addresses of the real stores in the real store address database may be calculated, and the store address of the real store having the highest similarity is determined as the first store address. The similarities between the store address of the first store and the store addresses of the real stores may be calculated based on similarities in terms of attribute of the store name. The attribute of the store address may include one or more of semantic, feature structure, word order, etc., and is not limited herein.

In step S1032, the first store address is converted into a second geographical location by using the electronic map.

Specifically, an interface of the electronic map for searching for Point of Interest function may be called, and the first store address may be inputted to this interface of the electronic map, so as to convert the first store address into a geographical location, i.e., the second geographical location, by using the electronic map. The second geographical location is a geographical location converted from the first store address by using the electronic map. The second geographical location may specifically include longitude and latitude, or other specific parameters, which is not limited herein.

In step S1033, similarities between the store name of the first store and store names of stores in a third area where the second geographical location is located in the electronic map are calculated.

The second target area includes the third area. The third area includes the second geographical location, and the size, shape, and location of the third area may be set according to scenarios, requirements, experience, etc., which is not limited herein. In some examples, the third area may be a circular area centered at the second geographical location and having a radius of a distance r3 which may be set according to scenarios, requirements, experience, etc., and for example, the distance r3 may be 1000 meters.

The higher the similarity between the store name of the first store and the store name of a certain store in the third area, the higher the likelihood that the first store is the same store as the certain store in the third area. The similarities between the store name of the first store and the store names of the stores in the third area may be calculated based on similarities in terms of attribute of the store name. The attribute of the store name may include one or more of semantic, feature structure, word order, etc., and is not limited herein.

In step S1034, the second target store name is searched according to the similarities between the store name of the first store and the store names of the stores in the third area and the second preset condition.

Under a condition that a store is found in the third area for which the similarity between the store name of the store and the store name of the first store satisfies the second preset condition, the store name of this store in the third area may be determined as the second target store name.

In step S1035, under a condition that the second target store name is not found in the third area, similarities between the store name of the first store and store names of stores in a fourth area surrounding the third area are calculated.

In some cases, due to errors in the conversion of the geographical location by the electronic map, similarity calculation errors, or other factors, the store name of the store for which similarity to the store name of the first store satisfies the second preset condition cannot be found in the third area, that is, the second target store name cannot be found in the third area. In this case, the second target area may be enlarged, and the second target store name is searched continuously in the enlarged area.

Specifically, the second target area may further include the fourth area. The fourth area is an outward extension of the third area and may surround the third area. In some examples, an inner boundary of the fourth area may overlap or be adjacent to an outer boundary of the third area, and a distance from the outer boundary of the third area to the second geographical location is less than a distance from an outer boundary of the fourth area to the second geographical location. The fourth area may be arranged around the second geographical location, and the distance from the outer boundary of the fourth area to the second geographical location may be determined according to scenarios, requirements, experience, etc., which is not limited herein, and for example, the distance from the outer boundary of the fourth area to the second geographical location may be 2000 meters. Reference may be made to the relationship between the first area and the second area in the above embodiments for the relationship between the third area and the fourth area, which is not repeated herein.

The higher the similarity between the store name of the first store and the store name of a certain store in the fourth area, the higher the likelihood that the first store is the same store as the certain store in the fourth area. The similarities between the store name of the first store and the store names of the stores in the fourth area may be calculated based on similarities in terms of attribute of the store name. The attribute of the store name may include one or more of semantic, feature structure, word order, etc., and is not limited herein.

In step S1036, the second target store name is searched according to the similarities between the store name of the first store and the store names of the stores in the fourth area and the second preset condition.

Under a condition that a store is found in the fourth area for which the similarity between the store name of the store and the store name of the first store satisfies the second preset condition, the store name of this store in the fourth area may be determined as the second target store name.

In the above steps S1021 to S1025, the first geographical location is obtained based on the store name of the first store, so as to select, based on the first geographical location, the first target area for searching for the first target store name. In the steps S1031 to S1036, the second geographical location is obtained based on the first store address in the real store address database which is most similar to the store address of the first store, so as to select, based on the second geographical location, the second target area for searching for the second target store name. Through the mutual compensation between the two target areas, i.e., the first target area and the second target area, the misjudgment of a real store due to a certain error is avoided, and the accuracy for determining the authenticity of a store is further increased.

Figure 4:
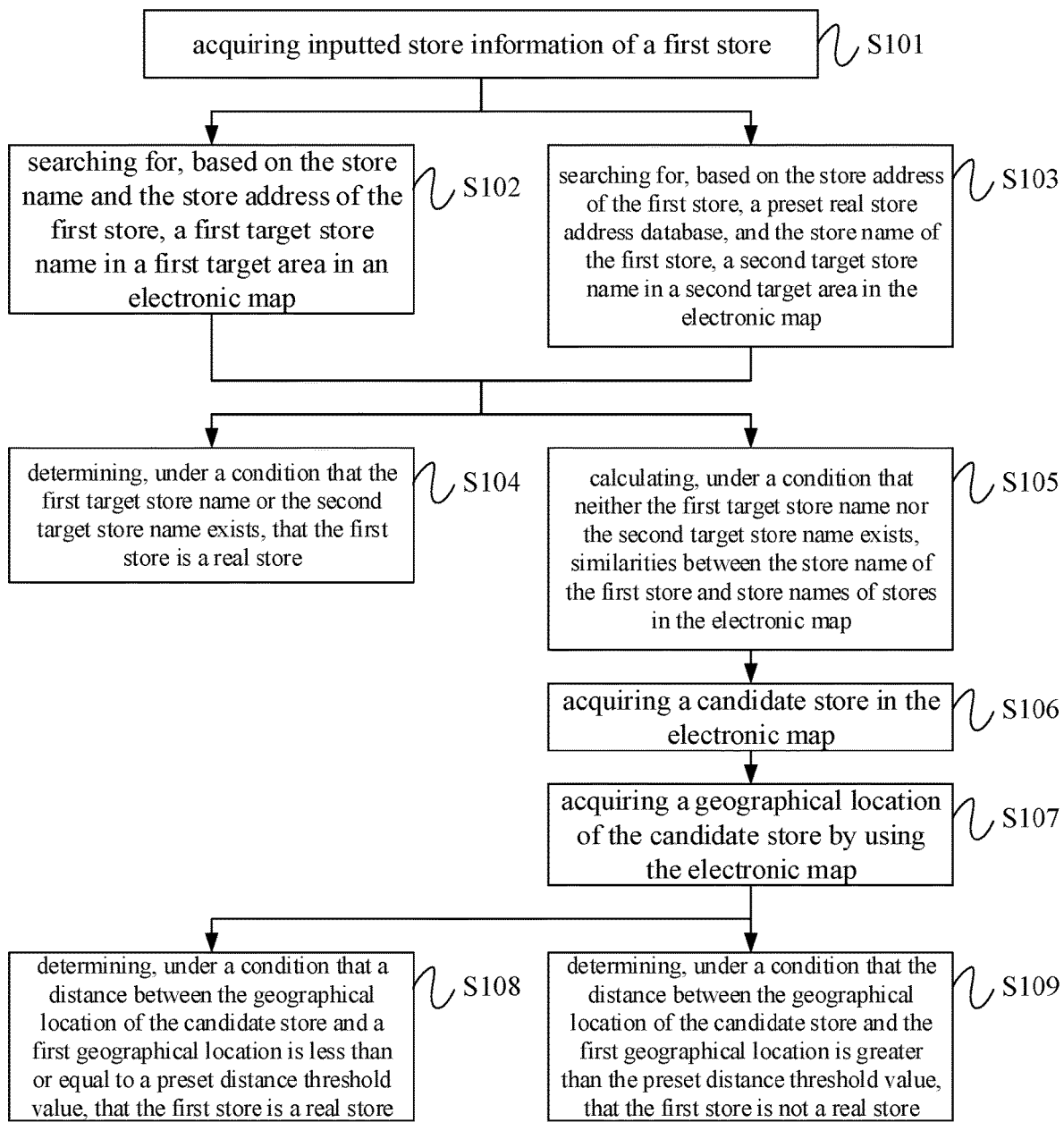
FIG. 4 shows a flowchart of yet another embodiment of a method for verifying a real store according to the present application.

In some embodiments, it may occur that the first target store name and the second target store name are not found, and in order to avoid the misjudgment of a real store, the searching scope may be expanded to the whole area of the electronic map. FIG. 4 shows a flowchart of yet another embodiment of a method for verifying a real store according to the present application. FIG. 4 differs from FIG. 1 in that the method for verifying a real store as shown in FIG. 4 may further include steps S105 to S109.

In step S105, under a condition that neither the first target store name nor the second target store name exists, similarities between the store name of the first store and store names of stores in the electronic map are calculated.

Under the condition that both the first target store name and the second target store name are not found, the searching scope may be continually expanded. The similarities between the store name of the first store and the store names of the stores in the electronic map may be calculated based on similarities in terms of attribute of the store name. The attribute of the store name may include one or more of semantic, feature structure, word order, etc., and is not limited herein.

In step S106, a candidate store in the electronic map is acquired.

The candidate store includes a store for which similarity between the store name of the store and the store name of the first store is higher than a real similarity threshold value. Reference may be made to relevant descriptions in the above embodiments for details of the real similarity threshold value, which is not limited herein.

In step S107, a geographical location of the candidate store is acquired by using the electronic map.

Specifically, the geographical location of the candidate store in the electronic map may be acquired. The geographical location of the candidate store may include longitude and latitude of the candidate store, or other specific parameters, which is not limited herein.

In step S108, under a condition that a distance between the geographical location of the candidate store and a first geographical location is less than or equal to a preset distance threshold value, it is determined that the first store is a real store.

The first geographical location is a geographical location converted from the store address of the first store by using the electronic map. The preset distance threshold value is used to determine whether the first store is the candidate store. The preset distance threshold may be set according to scenarios, requirements, experience, etc., and is not limited herein. For example, the preset distance threshold value may be 1000 meters. The distance between the geographical location of the candidate store and the first geographical location being less than or equal to the preset distance threshold value indicates that the first store is the candidate store. The candidate store is an entity store recorded in the electronic map, and thus it is determined that the first store is a real store.

In step S109, under a condition that the distance between the geographical location of the candidate store and the first geographical location is greater than the preset distance threshold value, it is determined that the first store is not a real store.

The distance between the geographical location of the candidate store and the first geographical location being greater than the preset distance threshold value indicates that the first store is not the candidate store. No entity store that is similar enough to the first store is found in the electronic map, and thus it is determined that the first store is an unreal store, that is, it is determined that the first store is not a real store.

The calculation of the similarity between the store names and the similarity between the store addresses in the above embodiments will be described in detail below.

The similarity in the above embodiments may be calculated based on attribute similarity. Specifically, the similarity between the store names may be calculated based on the attribute similarity of the store names, and similarly, the similarity between the store addresses may be calculated based on the attribute similarity of the store addresses.

The attribute similarity is the similarity in terms of attribute of the objects involved in the similarity calculation. In some examples, the attribute similarity may include, but is not limited to, one or more of: semantic similarity, feature structure similarity, and word order similarity. For example, the attribute similarity includes the semantic similarity, the feature structure similarity, and the word order similarity.

Semantic similarity between a first object and a second object refers to the similarity in terms of semantic, i.e., the meaning of language, between the first object and the second object. Feature structure similarity between the first object and the second object refers to the similarity in terms of language structure between the first object and the second object. Word order similarity between the first object and the second object refers to similarity in terms of word order, i.e. the order by which words are arranged in the language, between the first object and the second object.

The semantic similarity may be calculated based on a feature vector converted from the first object and a feature vector converted from the second object. Under a condition that the first object includes the store name of the first store, the second object includes a store name, and the second object may specifically include a store name of a store in the first target area, a store name of a store in the second target area, a store name of a store in the electronic map, etc., in the above embodiments, which may be selected according to specific requirements, and is not limited herein. Under a condition that the first object includes the store name of the first store, the second object includes a store name, and the second object may specifically include a store address of a real store in the real store address database, which is not limited herein.

Specifically, the first object and the second object may be respectively converted into feature vectors through a text feature extraction model. The type of the text feature extraction model is not limited herein, and for example, the text feature extraction model may be a Bidirectional Encoder Representation from Transformers (BERT) model, and the first object and the second object may be respectively converted into feature vectors using the BERT model through the following equations (1) and (2):

$$U = BERT(Mchnt_1)[\text{'pooler\_output'}] \quad (1)$$

$$V = BERT(Mchnt_2)[\text{'pooler\_output'}] \quad (2)$$

in which BERT is the BERT model, $Mchnt_1$ is the first object, $Mchnt_2$ is the second object, U is a feature vector converted from the first object, V is a feature vector converted from the second object, and pooler_output is an extracted sentence-level feature vector. The feature vectors converted from the first object and the second object are sentence-level feature vectors.

In order to facilitate processing, each of the feature vectors converted from the first object and the second object may be set as a d-dimensional feature vector, d is a positive integer and can be obtained according to scenarios, requirements, and experience, which is not limited herein. For example, d may be set as 3.

In some examples, the semantic similarity may be calculated based on average semantic information of the feature vector for the first object, average semantic information of the feature vector for the second object, and a preset smooth factor. A first magnitude of the feature vector converted from the first object and a second magnitude of the feature vector converted from the second object may be calculated based on the feature vector converted from the first object and the feature vector converted from the second object. The first magnitude may be the average semantic information of the feature vector converted from the first object, and the second magnitude may be the average semantic information of the feature vector converted from the second object. Then, the semantic similarity between the first object and the second object is calculated based on a product of the first magnitude and the second magnitude, a squared value of the first magnitude, a squared value of the second magnitude, and a preset first smooth factor.

For example, the semantic similarity between the first object and the second object may be represented by the feature vector converted from the first object and the feature vector converted from the second object, and may be calculated according to the following equations (3) to (5):

$$\mu_U = \frac{1}{d}\sum_{i=1}^{d} U_i \quad (3)$$

$$\mu_V = \frac{1}{d}\sum_{i=1}^{d} V_i \quad (4)$$

$$l(U, V) = \frac{2\mu_U \mu_V + C_1}{\mu_U^2 + \mu_V^2 + C_1} \quad (5)$$

in which $U_i$ is the $i^{th}$ dimensional data in the feature vector converted from the first object; $V_i$ is the $i^{th}$ dimensional data in the feature vector converted from the second object; d is the dimension of the feature vector, $\mu_U$ is the average semantic information of the feature vector converted from the first object, i.e., the magnitude of the sentence-level feature vector for the first object, which is the first magnitude; $\mu_V$ is the average semantic information of the feature vector converted from the second object, i.e., the magnitude of the sentence-level feature vector for the second object, which is the second magnitude; $C_1$ is the first smooth factor; and $l(U,V)$ is the semantic similarity between the feature vectors respectively converted from the first object and the second object. The value of the first smooth factor $C_1$ may be determined according to scenarios, requirements, experience, which is not limited herein. In some examples, the first smooth factor satisfies $C_1 < 1$.

The feature structure similarity may be calculated based on the feature vector converted from the first object and the feature vector converted from the second object. Under a condition that the first object includes the store name of the first store, the second object includes a store name, and the second object may specifically include a store name of a store in the first target area, a store name of a store in the second target area, a store name of a store in the electronic map, etc., in the above embodiments, which may be selected according to specific requirements, and is not limited herein. Under a condition that the first object includes the store name of the first store, the second object includes a store name, and the second object may specifically include a store address of a real store in the real store address database, which is not limited herein.

Specifically, the first object and the second object may be respectively converted into feature vectors through the text feature extraction model. Reference may be made to relevant descriptions in the above embodiments for the contents of the text feature extraction model and the feature vectors, which will not be repeated herein. For the equations for the feature vectors converted from the first object the second object, reference may be made to the equations (1) and (2) in the above embodiments.

In some examples, the feature structure similarity may be calculated based on a standard deviation of the feature vector for the first object, a standard deviation of the feature vector for the second object, a covariance of the feature vector for the first object and the feature vector for the second object, and a preset second smooth factor. A first standard deviation of the feature vector converted from the first object, a second standard deviation of the feature vector converted from the second object, and a covariance of the feature vector converted from the first object and the feature vector converted from the second object are calculated based on the feature vector converted from the first object and the feature vector converted from the second object. Then, the feature structure similarity between the first object and the second object is calculated based on a product of the first standard deviation and the second standard deviation, the covariance, and the preset second smooth factor. It should be noted that the second smooth factor for calculating the feature structure similarity may be the same as or different from the first smooth factor for calculating the semantic similarity, which is not limited herein.

For example, the feature structure similarity between the first object and the second object may be represented by the feature vector converted from the first object and the feature vector converted from the second object, and may be calculated according to the following equations (6) to (9):

$$\sigma_U = \sqrt{\frac{1}{d-1}\sum_{i=1}^{d}(U_i - \mu_U)^2} \quad (6)$$

$$\sigma_V = \sqrt{\frac{1}{d-1}\sum_{i=1}^{d}(V_i - \mu_V)^2} \quad (7)$$

$$\sigma_{UV} = \frac{1}{d-1}\sum_{i=1}^{d}(U_i - \mu_U)(V_i - \mu_V) \quad (8)$$

$$s(U, V) = \frac{\sigma_{UV} + C_2}{\sigma_U \sigma_V + C_2} \quad (9)$$

in which the definitions of $U_i$, $V_i$, $\mu_U$, $\mu_V$, and d are the same as the definitions in the above embodiments and not repeated herein; $\sigma_U$ is the standard deviation of the feature vector converted from the first object; $\sigma_V$ is the standard deviation of the feature vector converted from the second object; $\sigma_{UV}$ is the covariance of the feature vector converted from the first object and the feature vector converted from the second object, i.e., the consistence of the sentence-level feature in various semantic directions; s(U,V) is the feature structure similarity between the feature vector converted from the first object and the feature vector converted from the second object; and $C_2$ is the preset second smooth factor and may be set according to scenarios, requirements, and experience etc., which is not limited herein. For example, the second smooth factor satisfies $C_2$<1.

The word order similarity is calculated based on a feature matrix converted from the first object and a feature matrix converted from the second object. Under a condition that the first object includes the store name of the first store, the second object includes a store name, and the second object may specifically include a store name of a store in the first target area, a store name of a store in the second target area, a store name of a store in the electronic map, etc., in the above embodiments, which may be selected according to specific requirements, and is not limited herein. Under a condition that the first object includes the store name of the first store, the second object includes a store name, and the second object may specifically include a store address of a real store in the real store address database, which is not limited herein.

Specifically, the first object and the second object may be respectively converted into feature matrixes through a text feature extraction model. The type of the text feature extraction model is not limited herein, and for example, the text feature extraction model may be a BERT model, and the first object and the second object may be respectively converted into feature matrixes using the BERT model through the following equations (10) and (11):

$$N = BERT(Mchnt_1)[\text{'last\_hidden\_state'}] \quad (10)$$

$$M = BERT(Mchnt_2)[\text{'last\_hidden\_state'}] \quad (11)$$

in which the definitions of BERT, $Mchnt_1$, and $Mchnt_2$ are the same as the definitions in the above embodiments and not repeated herein; N is the feature matrix converted from the first object; M is the feature matrix converted from the second object: and last_ hidden_state is an extracted word-level feature matrix. The feature matrixes converted from the first object and the second object are word-level feature matrixes.

In order to facilitate processing, the feature matrix converted from the first object may be set as a feature matrix of length n, which is the text length of the first object, and width d, that is, the feature matrix converted from the first object is a n×d matrix. The feature matrix converted from the second object may be set as a feature matrix of length m, which is the text length of the second object, and width d, that is, the feature matrix converted from the second object is a m×d matrix. The width d of the feature matrix may be the same as the dimension d of the feature vector in the above embodiments.

In some examples, the word order similarity may be calculated using the N-gram model. The word order similarity may be calculated based on similarities between a plurality of consecutive word vectors in the feature matrix converted from the first object and a plurality of consecutive word vectors in the feature matrix converted from the second object, a text length of the first object, a text length of the second object, and a penalty term for the text length of the first object and the text length of the second object. First word vectors formed by column elements may be obtained from the feature matrix converted from the first object. Second word vectors formed by column elements may be obtained from the feature matrix converted from the second object. Each column of the elements in the feature matrix converted from the first object may form one first word vector. Each column of the elements in the feature matrix converted from the second object may form one second word vector. Word vector similarities between consecutive x first word vectors and consecutive x second word vectors are calculated, in which x=1, 2, 3 . . . , based on the first word vectors and the second word vectors. The word vector similarity between the consecutive x first word vectors and the consecutive x second word vectors may characterize the similarity between a word string of text length x in the first object and a word string of text length x in the second object. The word order similarity is calculated based on a plurality of the word vector similarities, the text length of the first object, the text length of the second object, and the penalty term for the text length of the first object and the text length of the second object. The word order similarity between the first object and the second object is obtained in combination with the similarities between a word string of text length x in the first object and a word string of text length x in the second object under different values of x.

For example, the word order similarity between the first object and the second object may be represented by the word order similarity between the feature matrix converted from the first object and the feature matrix converted from the second object, and may be calculated according to the following equations (12) to (14):

$$P_i = \frac{\sum_{k=0}^{m-i}\max\left\{\sum_{j=1}^{i}N_j \otimes M_{j+k}, \sum_{j=1}^{i}N_{j+1} \otimes M_{j+k}, \ldots, \sum_{j=1}^{i}N_{j+n-i} \otimes M_{j+k}\right\}}{\max(n, m)} \quad (12)$$

-continued $$\text{penalty} = \frac{e^{1-\frac{m}{n}} + e^{1-\frac{n}{m}}}{2} \quad (13)$$

$$o(N, M) = \text{penalty} \times \exp\left(\sum_{i=1}^{\min(n,m)} \omega_i \log P_i\right) \quad (14)$$

in which max is to take the maximum value; min is to take the minimum value; $P_i$ is the matching degree under a condition that the matching text length is i, i.e., the matching degree of i-gram; n is the text length of the first object; m is the text length of the second object; $N_j$ is a first word vector formed by the $j^{th}$ column of the elements in the feature matrix converted from the first object; $M_{j+k}$ is a second word vector formed by the $(j+k)^{th}$ column of the elements in the feature matrix converted from the second object; $\otimes$ represents dot product; $N_j \otimes M_{j+k}$ is a dot product of word-level features of the feature matrix converted from the first object and the feature matrix converted from the second object, which represents the similarity between the first object and the second object; max $\{\Sigma_{j=1}{}^i N_j \otimes M_{j+k}, \Sigma_{j=1}{}^i N_{j+1} \otimes M_{j+k}, \ldots, \Sigma_{j=1}{}^i N_{j+n-i} \otimes M_{j+k}\}$ is a sum of the similarities calculated for m−i iterations; $P_i$ is an average of the sum of the similarities calculated for m−i iterations; $P_i$ is an average of calculated sum of m−i rounds of similarities; $\Sigma_{j=1}{}^i N_j \otimes M_{j+k}$ is the similarity between consecutive k first word vectors in the feature matrix converted from the first object and consecutive k second word vectors in the feature matrix converted from the second object; $\Sigma_{j=1}{}^i N_{j+1} \otimes M_{j+k}$ is the similarity between consecutive (k−1) first word vectors in the feature matrix converted from the first object and consecutive (k−1) second word vectors in the feature matrix converted from the second object; $\Sigma_{j=1}{}^i N_{j+n-i} \otimes M_{j+k}$ is the similarity between consecutive (k−n+i) first word vectors in the feature matrix converted from the first object and consecutive (k−n+i) second word vectors in the feature matrix converted from the second object; penalty is the penalty term of the text length of the first object and the text length of the second object; o(N, M) is the word order similarity between the feature matrix converted from the first object and the feature matrix converted from the second object; and $\omega_i$ is the inverse of i. The maximum value of i is not limited herein, and may be set according to scenarios, requirements, experience, etc. In some examples, the maximum value of i may be less than or equal to 4 for facilitating the calculation. In the equations (12) to (14), the greater the difference between the text length of the first object and the text length of the second object, the lower the value of the penalty term, and the lower the word order similarity between the first object and the second object.

In some examples, the similarity between the first object and the second object may be a product of the $a_i$-th power of each of the attribute similarities, $a_i$ is a weight parameter for the $i^{th}$ attribute similarity of the attribute similarities, and i is a positive integer. The weight parameter may be set according to the importance of the attribute similarities, and is not limited herein. Under a condition that the similarity includes one attribute similarity, the similarity between the first object and the second object may be the $a_i$ power of this attribute similarity. It should be noted that the i in $a_i$ and the i in the equations (1) to (14) are independent from each other and do not affect each other.

For example, if the attribute similarity includes the semantic similarity; the similarity may be calculated according to the following equation (15):

$$sim(Mchnt_1, Mchnt_2) = l(U, V)^{a_1} \quad (15)$$

in which for the definitions of l(U, V) and $a_1$, reference may be made to the above embodiments, which are not repeated herein; and $sim(Mchnt_1, Mchnt_2)$ is the similarity between the first object and the second object.

For another example, if the attribute similarity includes the semantic similarity and the feature structure similarity, the similarity may be calculated according to the following equation (16):

$$sim(Mchnt_1, Mchnt_2) = l(U, V)^{a_1} s(U, V)^{a_2} \quad (16)$$

in which for the definitions of $sim(Mchnt_1, Mchnt_2)$, l(U, V), s(U, V), $a_1$, and $a_2$, reference may be made to the above embodiments, and are not repeated herein.

For yet another example, if the attribute similarity includes the semantic similarity, the feature structure similarity, and the word order similarity, the similarity may be calculated according to the following equation (17):

$$sim(Mchnt_1, Mchnt_2) = l(U, V)^{a_1} s(U, V)^{a_2} o(U, V)^{a_3} \quad (17)$$

in which for the definitions of $sim(Mchnt_1, Mchnt_2)$, l(U, V), s(U, V), o(U, V), $a_1$, $a_2$, and $a_3$, reference may be made to the above embodiments, and are not repeated herein.

The above method for verifying a real store is described below in the following example, in which the real similarity threshold value is 0.6.

A store name "XXX" of a first store is inputted, and the store name "XXX" does not include redundant field. The store name "XXX" is inputted into an electronic map, and a first geographical location (gps_x1, gps_y1) is obtained through conversion by the electronic map. Store names can be found within 1000 meters around the first geographical location (gps_x1, gps_y1) include "YYY1", "YYY2", and "YYY3", in which similarity between the store name "XXX" and the store name "YYY1" is the highest, and the calculation for the similarity between the store name "XXX" and the store name "YYY1" is described below.

The dimension of the feature vector and the feature matrix satisfies d=3. The attribute similarity includes semantic similarity, feature structure similarity, and word order similarity, and $a_1=a_2=a_3=1$. According to the above equations (1) to (14) and (17), the following equations may be obtained:

$$U = [-0.1170 \quad -0.0428 \quad -0.1075];$$

$$V = [0.0212 \quad -0.2200 \quad -0.2130];$$

$$N = \begin{bmatrix} -0.0388 & 0.0236 & -0.1030 \\ 0.0289 & -0.1297 & 0.0511 \\ -0.0306 & 0.0849 & -0.0263 \end{bmatrix};$$

-continued $$M = \begin{bmatrix} 0.1314 & -0.2232 & 0.0848 \\ 0.1769 & -0.1058 & -0.0808 \\ 0.2081 & -0.1812 & 0.1005 \\ -0.0152 & 0.0706 & -0.0198 \end{bmatrix};$$

$$\mu_U = \frac{1}{3}(-0.1170 - 0.0428 - 0.1075) = -0.0891;$$

$$\mu_V = \frac{1}{3}(0.0212 - 0.2200 - 0.2130) = -0.1373;$$

$$l(U, V) = 0.9164;$$

$$\sigma_U = 0.0404;$$

$$\sigma_V = 0.1373;$$

$$\sigma_{UV} = 0.003;$$

$$s(U, V) = 0.6110;$$

$$P_1 \approx \frac{1}{4};$$

$$P_2 \approx P_3 \approx 0;$$

$$\text{penalty} \approx 1;$$

$$o(N, M) \approx 0.8181;$$

$$s(U, V) = 0.6110;$$

$$sim(Mchnt_1, Mchnt_2) = 0.9146 \times 0.6110 \times 0.8181 = 0.4581.$$

The similarity between the store name "XXX" and the store name "YYY1" is 0.4581, which is less than the real similarity threshold value 0.6, and thus the first target store name is not found within 1000 meters around the first geographical location (gps_x1, gps_y1). The searching scope is expanded, and the search and similarity calculation are performed again within 1000 meters to 2000 meters around the first geographical location (gps_x1, gps_y1), but the first target store name is not found within 1000 meters to 2000 meters around the first geographical location (gps_x1, gps_y1), either.

The first store address "ZZZZ2" having the highest similarity to the store address "ZZZZ1" of the first store is found from the preset real store address database and inputted to the electronic map to obtain a second geographical location (gps_x2, gps_y3). The store name "XXX" having the highest similarity to the store name "XXX" is found within 1000 meters around the second geographical location (gps_x2, gps_y3), the similarity between the found store name "XXX" and the store name "XXX" of the first store is greater than the real similarity threshold value, that is, the second target store name exists, and it may be determined that the first store having the inputted store name "XXX" is a real store.

Figure 5:
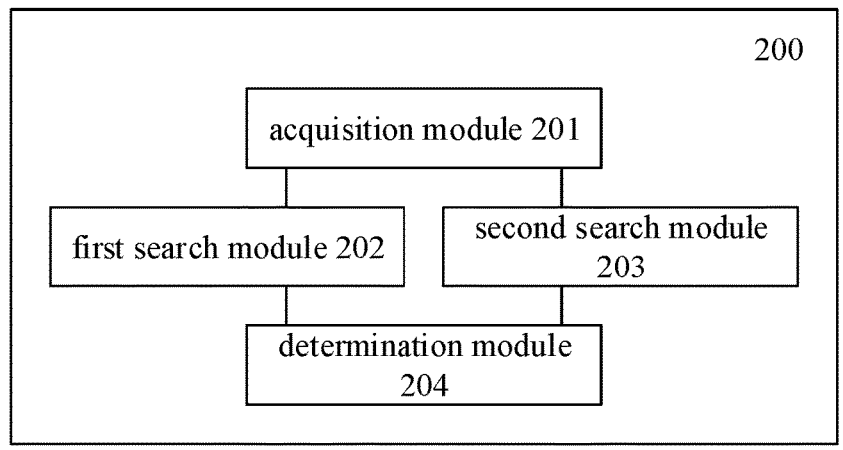
FIG. 5 shows a schematic structural diagram of one embodiment of an apparatus for verifying a real store according to the present application.

A second aspect of the present application provides an apparatus for verifying a real store. FIG. 5 shows a schematic structural diagram of one embodiment of an apparatus for verifying a real store according to the present application. As shown in FIG. 5, the apparatus 200 for verifying a real store may include an acquisition module 201, a first search module 202, a second search module 203, and a determination module 204.

The acquisition module 201 may be configured to acquire inputted store information of a first store.

The store information includes a store name and a store address.

The first search module 202 may be configured to search for, based on the store name and the store address of the first store, a first target store name in a first target area in an electronic map.

The first target store name is a store name in the first target area for which similarity to the store name of the first store satisfies a first preset condition.

In some examples, the first preset condition includes: the similarity to the store name of the first store is the highest among similarities between the store name of the first store and store names of stores in the first target area and is greater than a real similarity threshold value.

The second search module 203 may be configured to search for, based on the store address of the first store, a preset real store address database, and the store name of the first store, a second target store name in a second target area in the electronic map.

The real store address database includes store addresses of real stores. The second target store name is a store name in the second target area for which similarity to the store name of the first store satisfies a second preset condition.

In some examples, the second preset condition includes: the similarity to the store name of the first store is the highest among similarities between the store name of the first store and store names of stores in the second target area and is greater than the real similarity threshold value.

The determination module 204 may be configured to determine, under a condition that the first target store name or the second target store name exists, that the first store is a real store.

In the embodiments of the present application, the store name for which the similarity to the store name of the first store satisfies the condition in the first target area in the electronic map, i.e. the first target store name, may be found based on the inputted store name and store address of the first store. Moreover, the store name for which the similarity to the store name of the first store satisfies the condition in the second target area in the electronic map, i.e. the second target store name, may also be found based on the inputted store address of the first store, the inputted store name of the first store, and the store addresses of the real stores in the preset real store address database. At least one of the first target store name and the second target store name can be found, which indicates that an entity store corresponding to the first store exists in the electronic map, that is, the entity store exists in the real world, so that the authenticity of the store can be determined. No artificial participation is required in this process, and the efficiency for verifying the authenticity of the store is increased. Moreover, using the inputted store information in combination with the electronic map to search for similar store names in two target areas based on different conditions in the electronic map can further avoid errors in the search process and increase the accuracy for verifying the authenticity of the store.

In some embodiments, the first search module 202 may be configured to: convert the store address of the first store into a first geographical location by using the electronic map; calculate similarities between the store name of the first store and store names of stores in a first area where the first geographical location is located in the electronic map, in which the first target area includes the first area; and search for the first target store name according to the similarities between the store name of the first store and the store names of the stores in the first area and the first preset condition.

In some embodiments, the first search module 202 may be further configured to: calculate, under a condition that the first target store name is not found in the first area, similarities between the store name of the first store and store names of stores in a second area surrounding the first area in the electronic map, in which the first target area further includes the second area; and search for the first target store name according to the similarities between the store name of the first store and the store names of the stores in the second area and the first preset condition.

In some examples, the first area is centered at the first geographical location. An inner boundary of the second area overlaps or is adjacent to an outer boundary of the first area, and a distance from the outer boundary of the first area to the first geographical location is less than a distance from an outer boundary of the second area to the first geographical location.

In some embodiments, the second search module 202 may be configured to: search for a first store address having the highest similarity to the store address of the first store from the preset real store address database; convert the first store address into a second geographical location by using the electronic map; calculate similarities between the store name of the first store and store names of stores in a third area where the second geographical location is located in the electronic map, in which the second target area includes the third area; and search for the second target store name according to the similarities between the store name of the first store and the store names of the stores in the third area and the second preset condition.

In some embodiments, the second search module 202 may be further configured to: calculate, under a condition that the second target store name is not found in the third area, similarities between the store name of the first store and store names of stores in a fourth area surrounding the third area, in which the second target area further includes the fourth area; and search for the second target store name according to the similarities between the store name of the first store and the store names of the stores in the fourth area and the second preset condition.

In some examples, the third area is centered at the second geographical location. An inner boundary of the fourth area overlaps or is adjacent to an outer boundary of the third area, and a distance from the outer boundary of the third area to the second geographical location is less than a distance from an outer boundary of the fourth area to the second geographical location.

Figure 6:
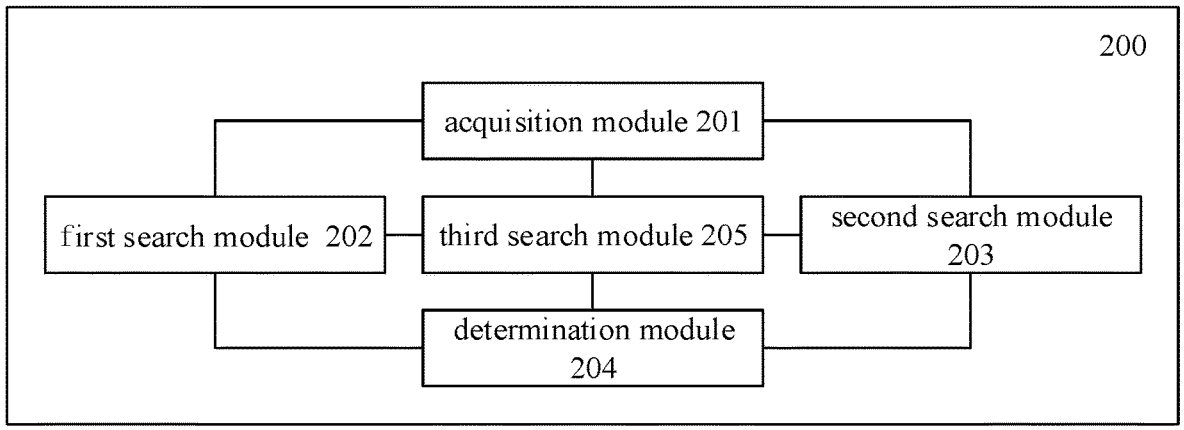
FIG. 6 shows a schematic structural diagram of another embodiment of an apparatus for verifying a real store according to the present application.

FIG. 6 shows a schematic structural diagram of another embodiment of an apparatus for verifying a real store according to the present application. FIG. 6 differs from FIG. 5 in that the apparatus 200 for verifying a real store shown in FIG. 6 may further include a third search module 205.

The third search module 205 may be configured to: calculate, under a condition that neither the first target store name nor the second target store name exists, similarities between the store name of the first store and store names of stores in the electronic map; acquire a candidate store in the electronic map, in which the candidate store includes a store for which similarity between the store name of the store and the store name of the first store is higher than a real similarity threshold value; and acquire a geographical location of the candidate store by using the electronic map.

The above determination module 204 may be further configured to: determine, under a condition that a distance between the geographical location of the candidate store and a first geographical location is less than or equal to a preset distance threshold value, that the first store is a real store, in which the first geographical location is a geographical location converted from the store address of the first store by using the electronic map; and determine, under a condition that the distance between the geographical location of the candidate store and the first geographical location is greater than the preset distance threshold value, that the first store is not a real store.

The similarity in the above embodiments is calculated based on attribute similarity.

In some examples, the attribute similarity may include one or more of: semantic similarity, feature structure similarity, and word order similarity.

In some examples, the similarity is a product of the $a_i$-th power of each of the attribute similarities, and $a_i$ is a weight parameter for the $i^{th}$ attribute similarity of the attribute similarities.

In some examples, the semantic similarity is calculated based on a feature vector converted from a first object and a feature vector converted from a second object.

The feature structure similarity is calculated based on the feature vector converted from the first object and the feature vector converted from the second object.

The word order similarity is calculated based on a feature matrix converted from the first object and a feature matrix converted from the second object.

Herein, under a condition that the first object includes the store name of the first store, the second object includes a store name. Under a condition that the first object includes the store address of the first store, the second object includes a store address.

In some examples, the apparatus 200 for verifying a real store as described above may further include a calculation module.

The calculation module may be configured to: calculate, based on the feature vector converted from the first object and the feature vector converted from the second object, a first magnitude of the feature vector converted from the first object and a second magnitude of the feature vector converted from the second object; and calculate the semantic similarity between the first object and the second object based on a product of the first magnitude and the second magnitude, a squared value of the first magnitude, a squared value of the second magnitude, and a preset first smooth factor.

The calculation module may be configured to: calculate, based on the feature vector converted from the first object and the feature vector converted from the second object, a first standard deviation of the feature vector converted from the first object, a second standard deviation of the feature vector converted from the second object, and a covariance of the feature vector converted from the first object and the feature vector converted from the second object; and calculate the feature structure similarity between the first object and the second object based on a product of the first standard deviation and the second standard deviation, the covariance, and a preset second smooth factor.

The calculation module may be configured to: obtain first word vectors formed by column elements from the feature matrix converted from the first object; obtain second word vectors formed by column elements from the feature matrix converted from the second object; calculate, based on the first word vectors and the second word vectors, word vector similarities between consecutive x first word vectors and consecutive x second word vectors, in which x=1, 2, 3 . . . ; and calculate the word order similarity based on a plurality of the word vector similarities, a text length of the first object, a text length of the second object, and a penalty term for the text length of the first object and the text length of the second object.

Figure 7:
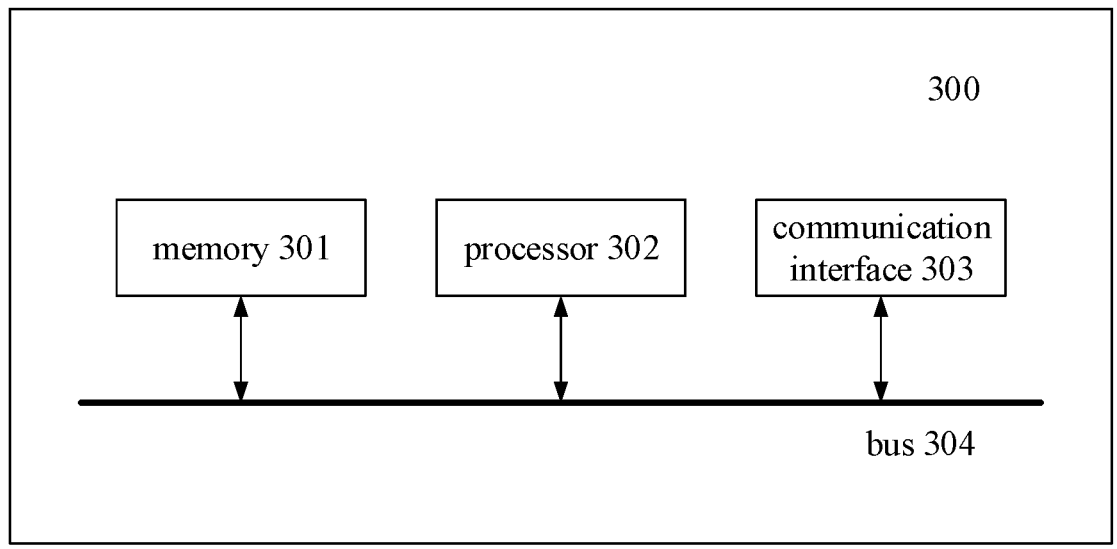
FIG. 7 shows a schematic structural diagram of one embodiment of a device for verifying a real store according to the present application.

A third aspect of the present application further provides a device for verifying a real store. FIG. 7 shows a schematic structural diagram of one embodiment of a device for verifying a real store according to the present application. As shown in FIG. 7, the device 300 for verifying a real store includes a memory 301, a processor 302, and a computer program stored on the memory 301 and executable on the processor 302.

In an example, the processor 302 may include a central processing unit (CPU), a specific integrated circuit (ASIC), or one or more integrated circuits configured to implement the embodiments of the present application.

The memory 301 may include a Read-Only Memory (ROM), a Random Access Memory (RAM), a magnetic disk storage medium device, an optical storage medium device, a flash memory device, an electrical, optical or any other physical/tangible memory storage device. Therefore, the memory generally includes one or more tangible (non-transitory) computer-readable storage media (for example, memory devices) encoded with software which includes computer-executable instructions, and the software, when executed (for example, by one or more processors), is operable to perform the operations described with reference to the method for verifying a real store according to the embodiments of the present application.

The processor 302 executes a computer program corresponding to an executable program code stored in the memory 301 by reading the executable program code, so as to implement the method for verifying a real store according to the above embodiments.

In an example, the device 300 for verifying a real store may further include a communication interface 303 and a bus 304. As shown in FIG. 7, the memory 301, the processor 302, and the communication interface 303 are connected and communicate with each other through the bus 304.

The communication interface 303 is mainly configured to achieve communication between various modules, apparatuses, units and/or devices in the embodiments of the present application. An input device and/or an output device may be further connected through the communication interface 303.

The bus 304 includes hardware, software, or both, and couples the components of the device 300 for verifying a real store to each other. As an example rather than limitation, the bus 304 may include an Accelerated Graphics Port (AGP) or other graphics bus, an Enhanced Industry Standard Architecture (EISA) bus, a Front Side Bus (FSB), a Hyper Transport (HT) interconnect, an Industry Standard Architecture (ISA) bus, a wireless band interconnect, a Low Pin Count (LPC) bus, a memory bus, a Micro Channel Architecture (MCA) bus, a Peripheral Component Interconnect (PCI) bus, a PCI-Express (PCI-E) bus, a Serial Advanced Technology Attachment (SATA) bus, a Video Electronics Standards Association Local Bus (VLB) bus, or other suitable bus or any combination of two or more of the above buses. Where appropriate, the bus 304 may include one or more buses. Although the embodiments of the present application describe and illustrate particular buses, the present application contemplates any suitable bus or interconnect.

A fourth aspect of the present application provides a computer readable storage medium storing computer program instructions thereon, in which the computer program instructions, when executed by a processor, can implement the method for verifying a real store in the above embodiments and achieve the same technical effect, which are not repeated herein. The computer-readable storage medium may include a non-transitory computer-readable storage medium such as a Read-Only Memory (ROM), a Random Access Memory (RAM), a magnetic disk or an optical disk, which is not limited herein.

It should be noted that, the embodiments in the specification are described in a progressive way, the same or similar parts of the embodiments may be referred to each other, and each embodiment focuses on differences from other embodiments. For the apparatus embodiments, the device embodiments, and the computer-readable storage medium embodiments, reference can be made to the description of the method embodiments for the related parts. The present application is not limited to the specific steps and structures described above and shown in the drawings. Those skilled in the art can make various changes, modifications and additions, or change the order of the steps after understanding the gist of the application. Moreover, for the sake of brevity, detailed description of known methods and technologies is omitted herein.

Aspects of the present application are described above with reference to flowcharts and/or block diagrams of the methods, apparatuses (systems) and computer program products according to the embodiments of the present application. It should be understood that, each block in the flowcharts and/or block diagrams and a combination of any of blocks in the flowcharts and/or block diagrams may be implemented by computer program instructions. These computer program instructions may be provided to a processor of a general purpose computer, a special-purpose computer, or other programmable data processing apparatus to produce a machine, so that these instructions, executed by the processor of the computers or other programmable data processing apparatus, enable the implementation of the function/action specified in one or more blocks of the flowcharts and/or block diagrams. Such processor may be, but is not limited to, a general purpose processor, a special purpose processor, an application specific processor, or a field programmable logic circuit. It should also be understood that, each block in the block diagrams and/or the flowcharts and a combination of blocks in the block diagrams and/or the flowcharts may be implemented by special purpose hardware that performs specified functions or actions, or by a combination of the special purpose hardware and computer instructions.

Those skilled in the art should understand that, the above embodiments are all illustrative rather than restrictive. Different technical features recited in different embodiments may be combined to achieve beneficial effects. Those skilled in the art should be able to understand and implement other modified embodiments of the disclosed embodiments on the basis of studying the drawings, the description, and the claims. In the claims, the terms "comprise", "comprising" do not exclude other apparatuses or steps; the numeral word "a/an" does not exclude a plurality of the involved items; the terms "first" and "second", etc., are used to indicate names and not to indicate any particular order. Any reference signs in the claims should not be construed as limiting the protection scope. The functions of several parts recited in the claims can be implemented by a single hardware or software module. Some technical features are recited in different dependent claims, but it does not mean that these technical features cannot be combined to obtain beneficial effects.

What is claimed is:

1. A method for verifying a store, the method to be executed by a device for verifying the store, the device comprising a processor and an interface circuitry, and the method comprising:
acquiring, by the processor, inputted store information of a first store, the store information comprising a store name and a store address;

interfacing, by the processor via the interface circuitry, with an electronic map to search for, based on the store name and the store address of the first store, a first target store name in a first target area in the electronic map, wherein the first target store name is a store name in the first target area for which similarity to the store name of the first store satisfies a first preset condition;

accessing, by the processor, a preset real store address database and interfacing with the electronic map to search for, based on the store address of the first store, the preset real store address database, and the store name of the first store, a second target store name in a second target area in the electronic map, wherein the second target store name is a store name in the second target area for which similarity to the store name of the first store satisfies a second preset condition, and the real store address database comprises store addresses of real stores; and verifying, by the processor, that the first store is a real store allowed to accept electronic payment, under a condition that the first target store name or the second target store name exists, wherein interfacing, by the processor, with the electronic map to search for, based on the store name and the store address of the first store, the first target store name in the first target area in the electronic map comprises:

calling an interface of the electronic map for searching for Point of Interest (POI) function so as to convert the store address of the first store into a first geographical location by using the electronic map;

calculating similarities between the store name of the first store and store names of stores in a first area where the first geographical location is located in the electronic map, the first target area comprising the first area; and searching for the first target store name according to the similarities between the store name of the first store and the store names of the stores in the first area and the first preset condition.

2. The method of claim 1, wherein interfacing, by the processor, with the electronic map to search for, based on the store name of the first store, the first target store name in the first target area in the electronic map further comprises:

calculating, under a condition that the first target store name is not found in the first area, similarities between the store name of the first store and store names of stores in a second area surrounding the first area in the electronic map, the first target area further comprising the second area; and searching for the first target store name according to the similarities between the store name of the first store and the store names of the stores in the second area and the first preset condition.

3. The method according to claim 2, wherein the first area is centered at the first geographical location; and an inner boundary of the second area overlaps or is adjacent to an outer boundary of the first area, and a distance from the outer boundary of the first area to the first geographical location is less than a distance from an outer boundary of the second area to the first geographical location.

4. The method according to claim 1, wherein accessing, by the processor, the preset real store address database and interfacing with the electronic map to search for, based on the store address of the first store, the preset real store address database, and the store name of the first store, the second target store name in the second target area in the electronic map comprises:

searching for a first store address having the highest similarity to the store address of the first store from the preset real store address database;

calling the interface of the electronic map for searching for POI function so as to convert the first store address into a second geographical location by using the electronic map;

calculating similarities between the store name of the first store and store names of stores in a third area where the second geographical location is located in the electronic map, the second target area comprising the third area; and searching for the second target store name according to the similarities between the store name of the first store and the store names of the stores in the third area and the second preset condition.

5. The method according to claim 4, wherein accessing, by the processor, the preset real store address database and interfacing with the electronic map to search for, based on the store address of the first store, the preset real store address database, and the store name of the first store, the second target store name in the second target area in the electronic map further comprises:

calculating, under a condition that the second target store name is not found in the third area, similarities between the store name of the first store and store names of stores in a fourth area surrounding the third area, the second target area further comprising the fourth area; and searching for the second target store name according to the similarities between the store name of the first store and the store names of the stores in the fourth area and the second preset condition.

6. The method according to claim 5, wherein the third area is centered at the second geographical location; and an inner boundary of the fourth area overlaps or is adjacent to an outer boundary of the third area, and a distance from the outer boundary of the third area to the second geographical location is less than a distance from an outer boundary of the fourth area to the second geographical location.

7. The method according to claim 1, wherein the first preset condition comprises: the similarity to the store name of the first store is the highest among similarities between the store name of the first store and store names of stores in the first target area and is greater than a real similarity threshold value; and the second preset condition comprises: the similarity to the store name of the first store is the highest among similarities between the store name of the first store and store names of stores in the second target area and is greater than the real similarity threshold value.

8. The method according to claim 1, further comprising:

calculating, under a condition that neither the first target store name nor the second target store name exists, similarities between the store name of the first store and store names of stores in the electronic map;

acquiring a candidate store in the electronic map, the candidate store comprising a store for which similarity between the store name of the store and the store name of the first store is higher than a real similarity threshold value;

acquiring a geographical location of the candidate store by using the electronic map;

determining, under a condition that a distance between the geographical location of the candidate store and a first geographical location is less than or equal to a preset distance threshold value, that the first store is a real store, wherein the first geographical location is a geographical location converted from the store address of the first store by using the electronic map; and determining, under a condition that the distance between the geographical location of the candidate store and the first geographical location is greater than the preset distance threshold value, that the first store is not a real store.

9. The method according to claim 1, wherein the similarity is calculated based on attribute similarities, and the attribute similarities comprise semantic similarity, feature structure similarity, and word order similarity.

10. The method according to claim 9, wherein the similarity is a product of an $a_i$-th power of each of the attribute similarities, and $a_i$ is a weight parameter for an $i^{th}$ attribute similarity of the attribute similarities.

11. The method according to claim 9, wherein the semantic similarity is calculated based on a feature vector converted from a first object and a feature vector converted from a second object;

the feature structure similarity is calculated based on the feature vector converted from the first object and the feature vector converted from the second object; and the word order similarity is calculated based on a feature matrix converted from the first object and a feature matrix converted from the second object;

wherein under a condition that the first object comprises the store name of the first store, the second object comprises a store name; and under a condition that the first object comprises the store address of the first store, the second object comprises a store address.

12. The method according to claim 11, further comprising:

calculating, based on the feature vector converted from the first object and the feature vector converted from the second object, a first magnitude of the feature vector converted from the first object and a second magnitude of the feature vector converted from the second object; and calculating the semantic similarity between the first object and the second object based on a product of the first magnitude and the second magnitude, a squared value of the first magnitude, a squared value of the second magnitude, and a preset first smooth factor.

13. The method according to claim 11, further comprising:

calculating, based on the feature vector converted from the first object and the feature vector converted from the second object, a first standard deviation of the feature vector converted from the first object, a second standard deviation of the feature vector converted from the second object, and a covariance of the feature vector converted from the first object and the feature vector converted from the second object; and calculating the feature structure similarity between the first object and the second object based on a product of the first standard deviation and the second standard deviation, the covariance, and a preset second smooth factor.

14. The method according to claim 11, further comprising:

obtaining first word vectors formed by column elements from the feature matrix converted from the first object;

obtaining second word vectors formed by column elements from the feature matrix converted from the second object;

calculating, based on the first word vectors and the second word vectors, word vector similarities between consecutive x first word vectors and consecutive x second word vectors, wherein x=1, 2, 3. . . ; and calculating the word order similarity based on a plurality of the word vector similarities, a text length of the first object, a text length of the second object, and a penalty term for the text length of the first object and the text length of the second object.

15. A non-transitory computer-readable storage medium storing computer program instructions thereon, wherein the computer program instructions, when executed by a processor, implement the method for verifying a store according to claim 1.

16. A device for verifying a store, comprising: a processor and an interface circuitry, wherein the processor is configured to:

acquire, inputted store information of a first store, the store information comprising a store name and a store address;

interface, via the interface circuitry, with an electronic map to search for, based on the store name and the store address of the first store, a first target store name in a first target area in the electronic map, wherein the first target store name is a store name in the first target area for which similarity to the store name of the first store satisfies a first preset condition;

access a preset real store address database and interfacing with the electronic map to search for, based on the store address of the first store, the preset real store address database, and the store name of the first store, a second target store name in a second target area in the electronic map, wherein the second target store name is a store name in the second target area for which similarity to the store name of the first store satisfies a second preset condition, and the real store address database comprises store addresses of real stores; and verify that the first store is a real store allowed to accept electronic payment, under a condition that the first target store name or the second target store name exists, wherein the processor is configured to interface with the electronic map to search for the first target store name in the first target area in the electronic map by:

calling an interface of the electronic map for searching for Point of Interest (POI) function so as to convert the store address of the first store into a first geographical location by using the electronic map;

calculating similarities between the store name of the first store and store names of stores in a first area where the first geographical location is located in the electronic map, the first target area comprising the first area; and searching for the first target store name according to the similarities between the store name of the first store and the store names of the stores in the first area and the first preset condition.

* * * * *